UNITED STATES PATENT OFFICE.

AUGUSTE J. ROSSI AND LOUIS E. BARTON, OF NIAGARA FALLS, NEW YORK, ASSIGNORS TO THE TITANIUM ALLOY MANUFACTURING COMPANY, OF NEW YORK, N. Y., A CORPORATION OF MAINE.

METHOD FOR PRODUCING A TITANIUM COMPOUND.

1,196,029.      Specification of Letters Patent.      Patented Aug. 29, 1916.

No Drawing.      Application filed November 29, 1912. Serial No. 733,943.

*To all whom it may concern:*

Be it known that we, AUGUSTE J. ROSSI and LOUIS E. BARTON, both citizens of the United States, and residents of Niagara Falls, in the county of Niagara and State of New York, have jointly invented a certain new and useful Method for Producing a Titanium Compound, of which the following is a specification.

Our present invention relates to the production from materials containing preferably high percentages of titanic acid, of a novel substance, being, when dried, an amorphous powder consisting, we believe, of a titanium sulfate, or sulfates, combined with hydrated titanic acid, and, as such, utilizable in various arts, and also, particularly, for extraction therefrom of a titanic oxid product of superior purity and novel characteristics.

The objects of our said invention comprise not only such production of said new article, but also provision of a method whereby the same may be readily, economically, and of high degree of purity prepared on industrial scales of manufacture.

Our said new article, or composition, we believe to be essentially a basic sulfate of titanium. It is characterized as containing, by analysis, a great preponderance of titanic oxid, say in the neighborhood of from 70% to 80%, as containing also less combined water than said titanic oxid, say in the neighborhood of from 15 to 20%, and as containing less combined sulfuric anhydrid than said water, say in the neighborhood of from 5% to 10%. It is, as produced by our hereinafter described method, also characterized as being in very finely divided or powdered state when dried, as pure white in color, and as of comparatively low specific gravity, *i. e.* about 2.60. It is also characterized as yielding on calcination a particularly pure and desirable titanic oxid concentrate, this being in the form of an exceedingly fine powder, and, as compared to titanic acids produced, or concentrated, by other methods, of very soft and smooth texture, and of lower specific gravity. Such previously obtained titanic oxid, for example "ortho-titanic" acids, derived by aid of alkali precipitation of acid solutions, result, when dried and calcined, in very hard, horny and dense masses; also titanic acids such as "meta-titanic acids," derived through precipitation from acid solutions of titanium, such as titanium chlorid and titanium sulfate, diluted with water and boiled, when dried and calcined are in the form of coarse gritty powder.

Our said basic titanium sulfate is producible by our hereinafter described method from any ore, or other substance, containing titanic oxid entangled with undesired elements and compounds, for example from so-called "titaniferous iron ores," but it is preferably, and the most economically, applicable to substances, including ores, which contain preponderance, or relatively high percentages, of titanic oxid, such for example as are designated "rutile," the which ores contain sometimes as high as 93% of titanic oxid besides, therewith commingled, oxids of iron and constituents of gangue.

Our said method of producing our said novel basic titanium sulfate is practised as follows:—We heat one of the aforesaid substances, or materials, containing titanic oxid in the presence of a reducing agent until its titanic oxid ($TiO_2$) is reduced to titanous oxid ($Ti_2O_3$). Taking for example a "rutile" ore we mix it, preferably finely pulverized, with carbon, such as coke, sufficient to insure said reduction according to the reaction $$2TiO_2 + C = Ti_2O_3 + CO$$

and smelt the mixture in any suitable furnace, preferably an electric furnace, sufficiently to insure completion of said reaction throughout the charge. The resulting melt, or slag, we withdraw from the furnace, pulverize it, preferably to about 80 mesh, and subject it to the action of a bath containing sulfuric acid $H_2SO_4$ in proportion sufficient to insure, as far as possible, formation in solution, from constituents of said bath including principally said titanous oxid, of titanous sulfate, said formation imparting to said bath a blue or violet color. While during such formation most of the titanous oxid appears to be thus dissolved in the bath, some, usually inconsiderable, part thereof may, for various reasons, remain as one of the insoluble residues of the bath, but capable however of being thereafter subsequently utilized for other than our present purposes. Our said bath is then withdrawn from its insoluble residues, as by decanting, being thus substantially freed from any solid impurities, and contaminations by unreduced and undissolved substances. We then precipitate our said novel composition by subjecting the bath to the action of any suitable means of precipitation such as dilution and boiling capable of so doing without, at the same time, precipitating the other constituents, if any, held in solution.

We have discovered that our said novel composition can, as such, with great rapidity, and completeness, be precipitated by adding a very small amount, say preferably about half of one per cent. in volume, of nitric acid to the bath, and boiling it.

It will be understood that the nitric acid when thus added in such relatively minute quantity is incapable of oxidizing, unless negligibly, the titanous sulfate present to titanic sulfate as per the equation

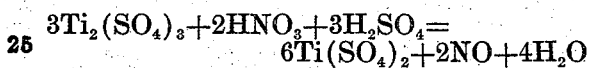

and therefore the nitric acid does not itself act as the required precipitant of our process, but it seems merely to accelerate, or promote, the precipitation otherwise caused by the oxygen of the atmosphere. Precipitation occurs in our boiling bath independently of our addition of the nitric acid which, as employed by us, we believe to act merely as a catalytic agent greatly stimulating and accelerating the oxidation of the titanous sulfate as required for its precipitation as a basic titanium sulfate.

Repeated tests have demonstrated that precipitation of our composition by boiling only, requires from one and a half to two hours, whereas by addition of the said minute quantity of nitric acid to the boiling solution the precipitation occurs to the same extent in less than one half of that time. The resulting precipitate consists of our hereinbefore described novel composition, which, being withdrawn in any convenient manner, will, after drying, be found to be a perfectly pure, and white, exceedingly soft and fine powder. It is then ready for use, as such, in the arts as may be desired, or, as above mentioned, there may be derived therefrom by calcination a product containing pure titanic oxid in higher proportions than hitherto obtainable in any form known to us, and possessing novel superior and advantageous characteristics which render it exceptionally desirable for many uses in the arts.

We have claimed as our invention, in a herewith cotemporaneously filed application for patent, our said product resulting from calcination of our herein claimed novel composition. An analysis of titanic acid powder resulting from said calcination disclosed as its constituents—

Silica ..................... 0.38%
Iron oxid ___ }
Alumina ___ } ........... 0.65%
Titanic oxid ............. 98.97%

We have now repeatedly produced our said novel article, or compound, by the above described preferred practice of our method. The following table indicates its resulting constituents, as disclosed by analysis of the respective products derived from four distinct operations of our method, impurities such as the small amounts above indicated being discarded in calculation:

|  | No. 230. | No. 330. | No. 338. | No. 341. |
|---|---|---|---|---|
| Titanic oxid | 70.78 | 75.01 | 76.37 | 73.36 |
| Sulfuric anhydrid | 9.85 | 5.38 | 8.40 | 8.81 |
| Combined water | 19.37 | 19.61 | 15.23 | 17.83 |
|  | 100.00 | 100.00 | 100.00 | 100.00 |

We find, in practice, that the constituents of our said novel composition or article may be predicated as varying between certain definite limits substantially as follows:—

Titanic oxid, say _____ 70 to 80%
Sulfuric anhydrid _____ 5 to 10%
Combined water _____ 15 to 20%

It would thus seem that our novel product or composition of matter, though possibly not a definite chemical compound, may be reasonably presumed to consist essentially of a titanium sulfate chemically combined with quantities of hydrated titanic oxid which are variable within certain predicatable limits.

We make claim to our said novel titanium compound in our herewith co-pending application for patent, Serial No. 13,478, filed March 10, 1915.

We claim herein the following, viz:

1. The method of treating a substance containing titanic oxid ($TiO_2$) and iron oxid which comprises heating said substance in presence of a reducing agent until titanic oxid is reduced to titanous oxid ($Ti_2O_3$); subjecting the resulting melt to the action of a bath containing sulfuric acid ($H_2SO_4$) in proportion sufficient to insure, as far as possible, formation, in solution, of titanous sulfate; adding about one half of one per cent., in volume, of nitric acid to the bath; and diluting and boiling it until a basic titanium sulfate is precipitated.

2. The method of treating a substance containing titanic oxid ($TiO_2$) and iron oxid which comprises heating said substance together with carbon until titanic oxid is reduced to titanous oxid ($Ti_2O_3$); subjecting the resulting melt to the action of a bath containing sulfuric acid ($H_2SO_4$) in proportion sufficient to insure, as far as possible, formation, in solution, of titanous sulfate; adding about one half of one per cent., in volume, of nitric acid to the bath; and diluting and boiling it until a basic titanium sulfate is precipitated.

3. The method of treating a substance containing titanic oxid ($TiO_2$) and iron oxid which comprises heating said substance in presence of a reducing agent until titanic oxid is reduced to titanous oxid ($Ti_2O_3$); subjecting the resulting melt to the action of a bath containing sulfuric acid ($H_2SO_4$) in proportion sufficient to insure, as far as possible, formation, in solution, of titanous sulfate; diluting and boiling the bath and increasing rapidity and completeness of resulting precipitation of basic titanium sulfate by meanwhile adding nitric acid to the bath.

4. The method of treating a substance containing titanic oxid ($TiO_2$) and iron oxid which comprises heating said substance together with carbon until titanic oxid is reduced to titanous oxid ($Ti_2O_3$); subjecting the resulting melt to the action of a bath containing sulfuric acid ($H_2SO_4$) in proportion sufficient to insure, as far as possible, formation, in solution, of titanous sulfate; diluting and boiling the bath and increasing rapidity and completeness of resulting precipitation of basic titanium sulfate by meanwhile adding nitric acid to the bath.

AUGUSTE J. ROSSI.
LOUIS E. BARTON.

Witnesses:
WALTER D. EDMONDS,
PHILIP C. PECK.